United States Patent [19]

Catania et al.

[11] Patent Number: 5,154,643
[45] Date of Patent: Oct. 13, 1992

[54] METHOD AND APPARATUS FOR POSITIONING TOOLING

[75] Inventors: Mark J. Catania, Buffalo; Ernest K. Krell, Lewiston, both of N.Y.

[73] Assignee: Gemcor Engineering Corporation, Buffalo, N.Y.

[21] Appl. No.: 833,625

[22] Filed: Feb. 7, 1992

Related U.S. Application Data

[63] Continuation of Ser. No. 605,117, Oct. 29, 1990, abandoned.

[51] Int. Cl.$^5$ .......................... B23Q 5/54; B23C 1/12; B23B 39/14
[52] U.S. Cl. .................... 29/34 B; 29/524.1; 227/66; 408/37; 409/202; 409/212
[58] Field of Search ............ 29/34. B, 524.1, 243.53, 29/243.54, 525.2; 409/131, 132, 174, 202, 212, 213, 235, 219; 408/37, 39, 45; 83/916, 452; 227/58, 69, 70, 66

[56] References Cited

U.S. PATENT DOCUMENTS

| | | | |
|---|---|---|---|
| 2,559,248 | 7/1951 | Harcourt | 78/48 |
| 4,203,204 | 5/1980 | Murphy | 29/524.1 X |
| 4,583,891 | 4/1986 | Eschenfelder et al. | 409/212 X |
| 4,662,556 | 5/1987 | Gidlund | 29/34 B X |
| 4,762,261 | 8/1988 | Hawly et al. | 29/243.53 |
| 4,864,702 | 9/1989 | Speller et al. | 29/34 B |
| 4,864,713 | 9/1989 | Roberts et al. | 29/524.1 |
| 4,885,836 | 12/1989 | Bonomi et al. | 29/34 B X |
| 4,955,119 | 9/1990 | Bonomi et al. | 29/34 B |

FOREIGN PATENT DOCUMENTS

| | | |
|---|---|---|
| 0338117 | 10/1989 | European Pat. Off. |
| 3535761 | 3/1987 | Fed. Rep. of Germany |
| 859047 | 8/1981 | U.S.S.R. ............... 409/202 |
| 1103930 | 7/1984 | U.S.S.R. ............... 29/34 B |
| 2148170 | 5/1985 | United Kingdom |

*Primary Examiner*—William Briggs
*Attorney, Agent, or Firm*—Hodgson, Russ, Andrews, Woods & Goodyear

[57] ABSTRACT

A method and apparatus for positioning tooling (16, 16) with respect to an arc-shaped workpiece assembly (12) spaced radially away from a centerline (14). The apparatus includes axially spaced apart support arm assemblies (40, 42) which are swingable about the centerline. Each support arm is provided with a fixed portion (72) and a radially inwardly and outwardly movable portion (70), the movable portions of both arm assemblies being simultaneously movable under the control of a CNC controller (58). The ends of inner and outer beams (36, 38) are supported by the radially movable portion (70). Supported upon each of the inner and outer beams is a carriage assembly (32, 34) movable along the beam (36, 38). A head (28, 30) is supported upon each of the carriages, each head having a relatively stationary half (124) and a shiftable half (122), the shiftable half being mounted upon a track carried by the stationary half to provide for movement about a center point. In operation the beams will be swung to their desired position about the centerline, the carriages will be moved to their desired positions, at least one of the heads will be extended, and the tooling will be advanced towards the workpiece, all of this movement being controlled by the CNC controller. To permit loading of the apparatus, the inner beam may be split and shifted axially outwardly as the workpiece assembly is loaded.

26 Claims, 5 Drawing Sheets

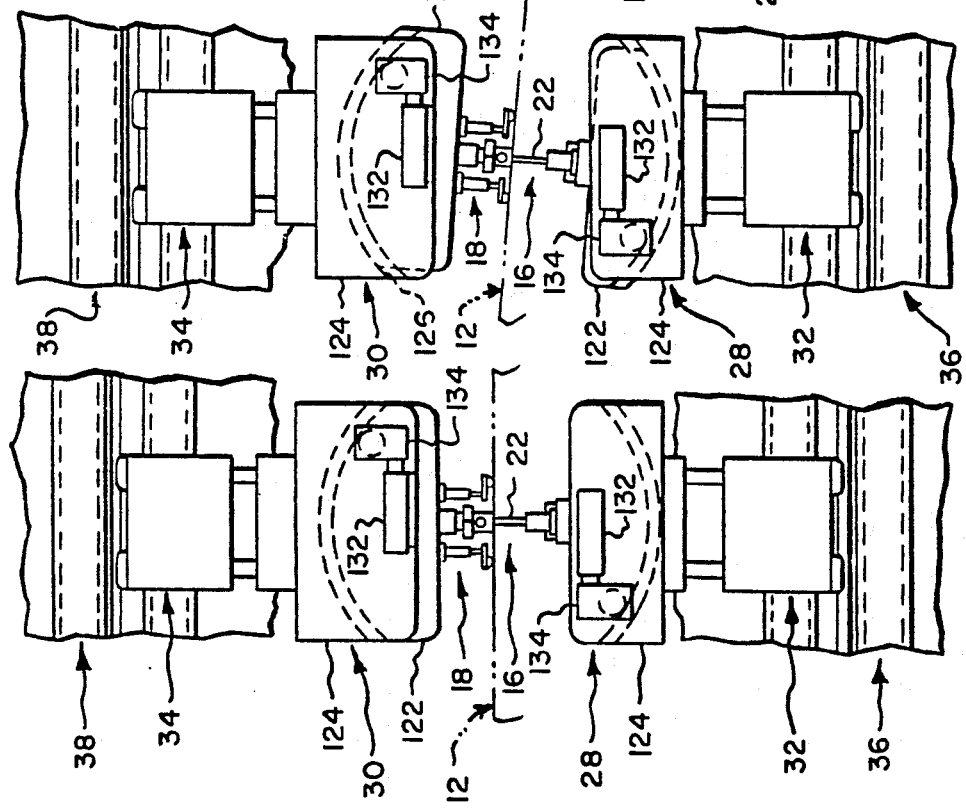

METHOD AND APPARATUS FOR POSITIONING TOOLING

This application is a continuation of application Ser. No. 07/605,117, filed Oct. 29, 1990 abandoned.

TECHNICAL FIELD

The present invention relates generally to a method and apparatus for positioning tooling with respect to an arc-shaped workpiece assembly, which assembly is spaced radially away from a centerline. In the illustrated embodiment the arc-shaped workpiece assembly is an aircraft fuselage section and the tooling is drilling and riveting tooling.

BACKGROUND OF THE INVENTION

In the manufacture of aircraft various systems have been utilized for assembling large cylindrical parts. Traditional manufacture has involved enormous manual effort and extensive fixturing of the parts. However, the manual effort leads to lack of a close process control resulting in frequent and costly reworks.

In order to avoid the disadvantages of manually supporting tooling used to fasten arc-shaped sections together, it has been proposed to maintain the arc-shaped sections, such as the sections of a fuselage, on dedicated fixtures and to further provide costly dedicated track systems for supporting automatic drilling and fastening machinery. While such designs are satisfactory for their intended purpose, due to the lack of design flexibility there is a high manufacturing cost.

OBJECTS OF THE INVENTION

It is an object of the present invention to provide a new and improved method and apparatus for positioning tooling which works upon large arc-shaped workpiece assemblies wherein relatively long generally cylindrical sections may be engaged by the apparatus of the present invention.

It is another object of the present invention to provide a new and improved method and apparatus for positioning tooling which works upon large arc-shaped workpiece assemblies wherein a wide range of workpiece diameters and configurations may be engaged by the tooling, which tooling is positioned by servo motors and the like.

It is a further object of the present invention to reduce the manual effort utilized in assembling arc-shaped workpiece assemblies together.

It is a still further object of the present invention to provide better process control.

Another object of the present invention is to provide an improved method and apparatus for loading and unloading a workpiece assembly at a workstation.

These and other objects and advantages of the present invention will be described below in conjunction with the accompanying drawings in which one form of the present invention is illustrated.

BRIEF DESCRIPTION OF THE DRAWINGS

FIGS. 7, 8 and 9 further illustrate panel sensing and normalization of the tooling.

DETAILED DESCRIPTION

Figure 1:
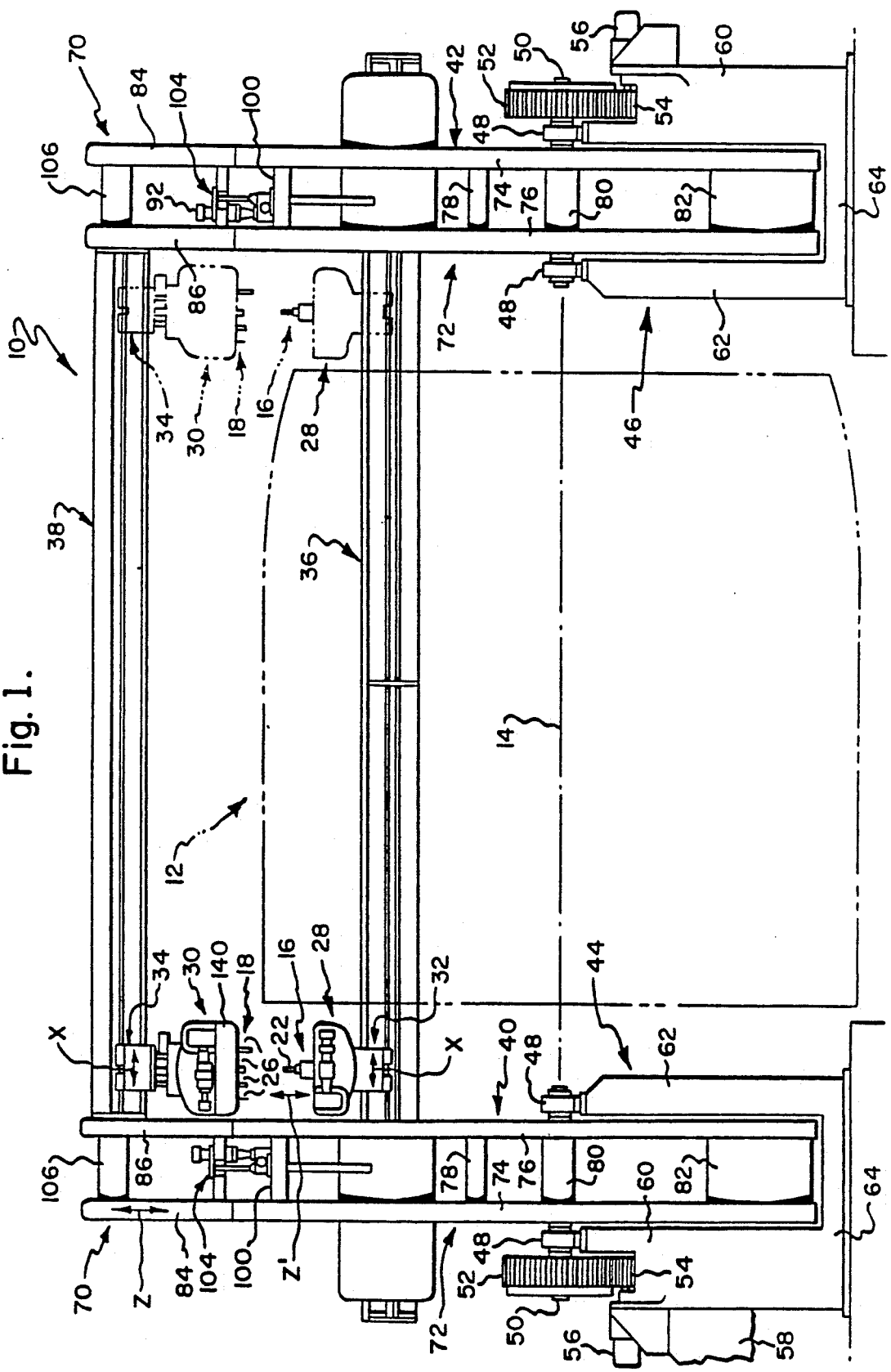
FIG. 1 is a side view of the apparatus of the present invention.

With reference to FIG. 1 the apparatus for positioning tooling is indicated generally at 10 and the arc-shaped workpiece assembly is shown in phantom lines and is indicated generally at 12, the workpiece assembly being radially spaced away from a centerline 14, with the surface of the assembly 12 intersected by a plane normal to the centerline being generally circular. The apparatus 10 supports inner and outer tooling, indicated generally at 16 and 18, which tooling may engage the workpiece assembly 12 during a manufacturing operation. Thus, the inner or lower tooling may include an inner or lower pressure foot bushing 20 (FIG. 6), an inner or lower riveting anvil 22, and may include other components such as a probe to verify part locations prior to a final fastening operation. The outer or upper tooling 18 may include an upper or outer pressure foot bushing 24 (shown in FIG. 6) as well as various other components indicated at 26 in FIG. 1, which other upper tooling components may be a drill spindle, an outer or upper riveting anvil, a straight down sealant dispenser, a shave spindle if required, and any other tooling component which may be desired. Other tooling components, which may be mounted at either an inner or outer tooling location, may include various measuring, testing, and inspection devices, machinery devices, and assembly devices. The inner or lower tooling 16 and outer or upper tooling 18 are in turn carried by inner and outer heads indicated generally at 28 and 30, respectively. Each of the heads 28 and 30 is in turn carried by a carriage. Thus, the inner head 28 is supported by an inner carriage 32 and the outer head is supported by an outer carriage 34. Each of the carriages 32, 34 is in turn supported by a beam. Thus, the inner carriage 32 is supported on an inner beam 36 whereas the outer carriage 34 is in turn supported on an outer beam 38. Each of the beams is provided with a suitable track structure, and the associated carriage rides upon the track of the associated beam for movement between left-hand and right-hand positions. The left-hand position is indicated in full lines in FIG. 1, the right-hand position is indicated by broken lines in FIG. 1, and various intermediate working positions are illustrated in FIGS. 7 through 9.

The inner and outer beams 36, 38 extend between first and second axially spaced apart swingable support arm assemblies. The first support arm assembly, which is indicated generally at 40, is shown to the left in FIG. 1, and the second support arm assembly 42 is shown to the right. Each of the support arm assemblies is in turn mounted upon a trunnion assembly, the first support arm assembly 40 being supported by a first trunnion assembly, indicated generally at 44, and the second support arm assembly 42 being mounted upon a second trunnion assembly 46. The trunnion assemblies are each substantially identical and therefore common reference numerals will be applied to each of the trunnion assemblies. Thus, each trunnion assembly includes a pair of spaced apart bearings 48 through which a shaft 50 is journalled. The shaft 50 supports the associated support arm assembly 40 or 42 and a gear 52 for rotation with the shaft 50. The gear 52 is in mesh with a pinion 54 (FIG. 2) which is in turn driven by a motor 56 under the control of a CNC controller 58 which also controls the operation of various other servo motors of the present apparatus. The pinions 54 will be rotated together to impart an "a-axis" movement to the arm assemblies 40, 42, this being indicated by the arrow "a" in FIG. 3. The bearings 48 are in turn supported by a pair of spaced apart supports 60, 62 which extend upwardly from a base 64, the base being in turn mounted upon the floor F of a factory. While in FIG. 1 the bases 64 are shown extending below the associated support arm assemblies 40 or 42, it should be noted that each base may be split if necessary to provide for a counterweight pit which extends below the upper surface of the floor, the counterweight pit being illustrated at 66 in FIG. 4. Also, it may be desirable to provide a workpiece assembly pit between the trunnion assemblies 44, 46 and this is also illustrated at 68 in FIG. 4.

Figure 2:
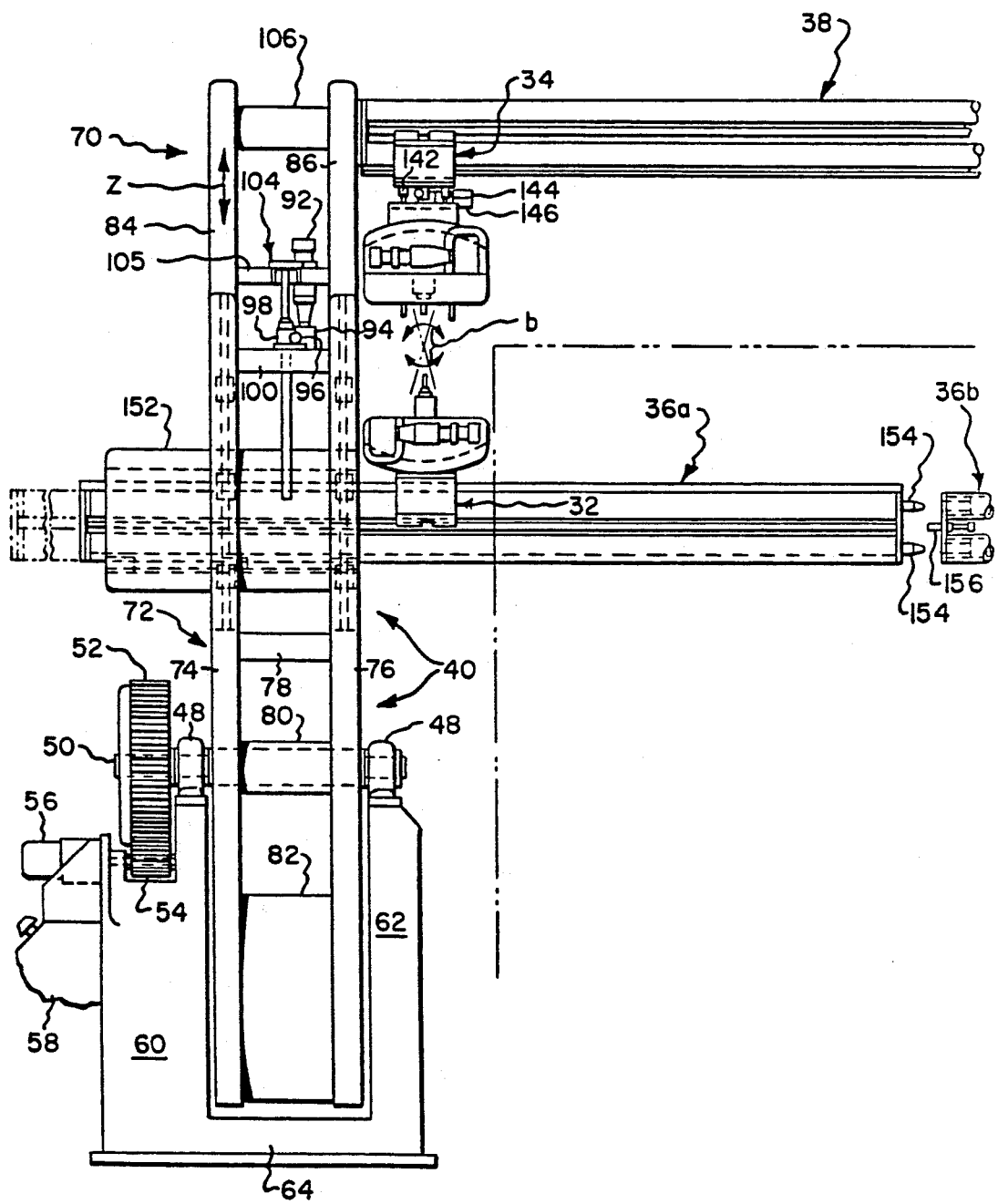
FIG. 2 is an enlarged view of a portion of the apparatus shown in FIG. 1.
Figures 3, 3A:
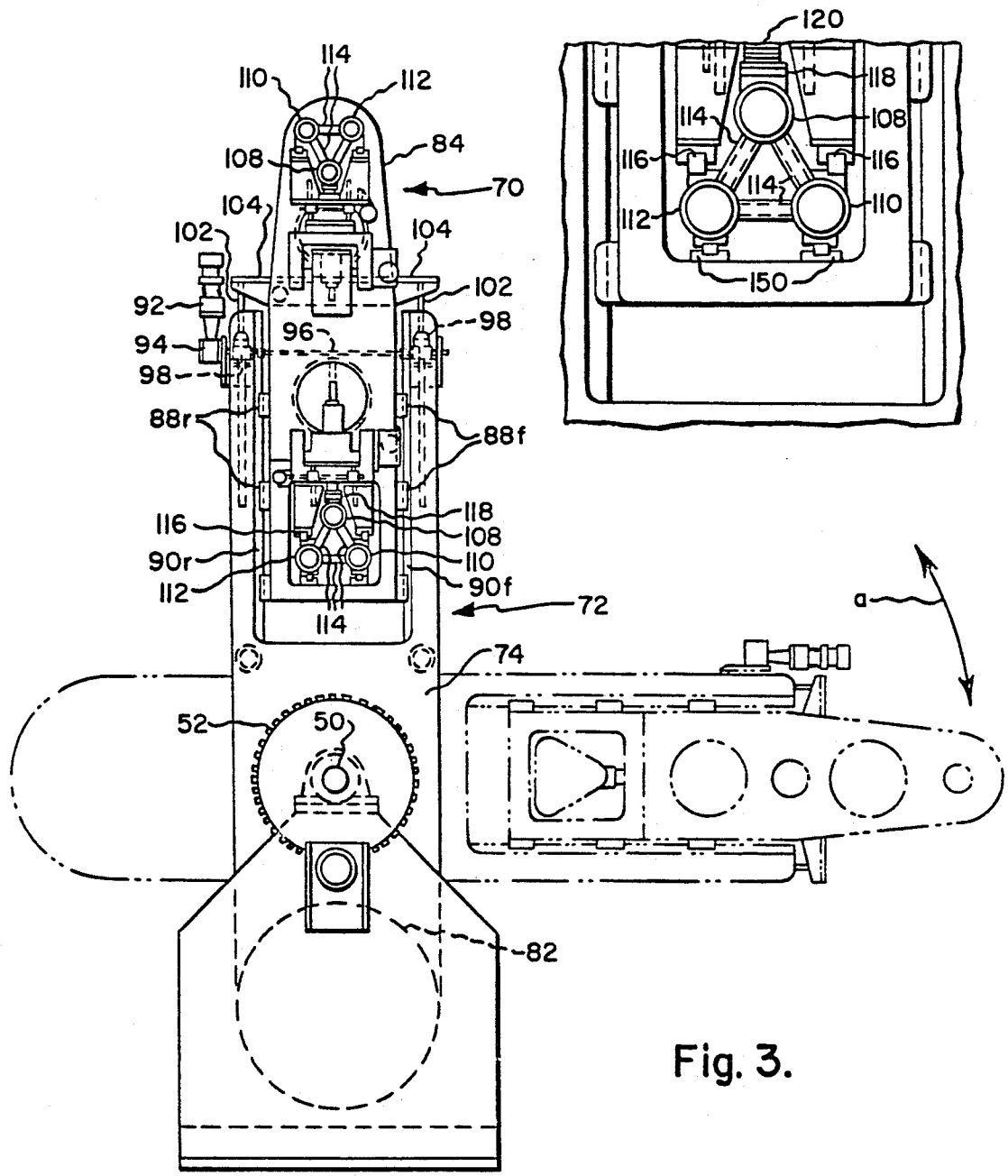
FIG. 3 is an end view of the apparatus shown in FIG. 2, a portion of the apparatus being shown in an alternate position in dot-dash lines.
FIG. 3A is an enlarged view of a portion of FIG. 3.

While the controller 58 is shown mounted on a support 60 in FIGS. 1 and 2, it should be appreciated that the controller may be at any desired location.

Each of the support arm assemblies 40, 42 is of essentially the same construction and therefore like reference numerals will be applied to these assemblies in the following detailed description. Each of the support arm assemblies includes a radially inwardly and outwardly movable support arm portion indicated generally at 70 (FIGS. 2 and 3) and a radially fixed support arm portion indicated generally at 72. As best shown in FIG. 2, the fixed support arm portion 72 includes left and right frames 74 and 76, spacers 78 and 80, and a counterweight 82, which counterweight may be of any suitable material. Spacer 80 is disposed about the shaft 50. The radially inwardly and outwardly movable support arm portion 70 also consists of left and right frame portions 84 and 86 and various spacers. Each of the movable support arm portions 70 is provided with a plurality of front and rear linear bearings 88f, 88r (FIG. 3) which engage vertically extending front and rear tracks 90f, 90r carried a corresponding frame portion of the associated fixed support arm portion 72.

A mechanism is provided for moving each of the movable arm portion 70 in a z-axis direction with respect to the associated fixed arm portion 72. This z-axis mechanism includes a motor 92 which acts through gear box 94, cross-shaft 96, and a pair of additional gear boxes 98. Each gear box 98 is supported upon a spacer 100 which extends between the left and right frame portions 84, 86 of the movable support arm portion 70. Each of the gear boxes 98 drives a nut-like element (not shown) which is in turn coupled to a radially extending threaded shaft 102, the top end of which shaft is rigidly secured to a bracket assembly indicated at 104, which bracket assembly include a spacer 104s extending between the left and right frame portions 84, 86. In addition to the spacers 100 and bracket assemblies 104 there is a further upper spacer 106 between the frame portions 84 and 86.

Each motor 92, which is under the control of the CNC controller 58, will cause the nut-like element within each gear box 98 to rotate causing z-axis movement of the radially outwardly shiftable support arm portion 70. The controller 58 will simultaneously control the motors 92 on either end of the apparatus and suitable feedback mechanisms may be provided to ensure that the radially inwardly movable support arm portions 70 on the first and second support arm assemblies 40, 42 move together in a simultaneous manner.

Each of the inner and outer beams consists of 3 triangularly spaced apart tubes 108, 110, 112 (FIG. 3) which are interconnected by connection elements or trusses 114. Each of the beams carries square linear bearing assemblies 116 (best shown in FIG. 3A) such as the LY series manufactured by NSK Nippon Seiko for slidably supporting the associated carriage 32 or 34. A gear rack 118 is mounted on tube 108 and may be engaged by a suitable pinion 120 for the purpose of driving the associated carriage in an x-axis direction along the beam. The pinion is in turn connected to a suitable motor (not shown) supported by the associated carriage 32 or 34, which motor is under the control of the CNC controller 58. It should be apparent that a signal can be sent to the motor from the controller to cause the pinion to be rotated a desired amount to be placed in a specific location. In addition, feedback information may be provided to the controller, which feedback information can be from any suitable encoder or the like. The controller 58 will simultaneously control the motors for pinions 120 for each of the carriages 32, 34 to ensure that they are maintained in opposition at all times as best shown in FIGS. 7 to 9.

Figure 6:
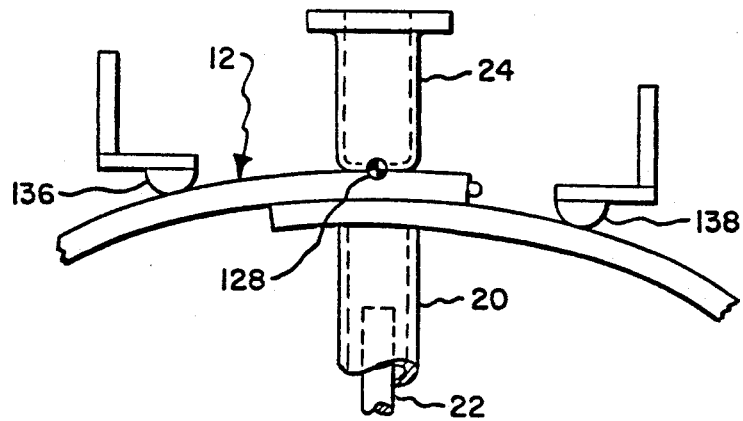
FIG. 6 illustrates a portion of the apparatus utilized for panel sensing.

Each of the heads 28, 30 consists of a first half shiftable on a track carried by a relatively stationary second half, the shiftable or movable first half being indicated at 122 (FIG. 9) and the relatively stationary second half being indicated at 124. As can be seen (FIG. 9), the stationary half 124 is of a generally C-shaped cross-section and is provided with a pair of spaced apart tracks 126 which are curved about a center point which lies upon the top surface of the workpiece assembly when the parts are in their normal operational position, the center point being indicated at 128 in FIG. 6. The movable half 122 of each of the heads 28 or 30 is provided with suitable track followers (not shown) so that each movable half can be shifted about the center point 128. To this end, a curved rack is provided which forms part of one of the tracks 126 and a pinion 130 (FIG. 9) engages the curved rack 126, the pinion being driven through motor 132 and gear box 134. The motor 132 is under the control of the controller 58 and may shift the associated movable half 122 about the center point 128 in accordance with sense signals received from panel sensors 136 and 138 (FIG. 6). The sensors will sense when the tooling is not normal to the desired surface, and will send a feedback signal to the CNC controller 58 which will in turn cause the operation of the motor 132 to be initiated to achieve normalization as the tooling is moved into engagement with the workpiece assembly. As a general rule normalization will only be achieved with respect to one surface, typically the upper surface, this being illustrated in the various figures. The motion imparted to the inner half 122 of the heads 28, 30 by the motors 132 is referred to as "b-axis" motion.

The tooling is supported on the movable half 122 of each of the heads 28, 30 and the tooling may include a subframe 140 (FIG. 1) on one of the heads capable of lateral shifting movement with respect to the movable head 122 to properly position desired tooling with respect to the point of operation 128. While the subframe and the various tooling carried by the subframe is not fully illustrated in the accompanying drawings, it may be of the type as shown in U.S. Pat. Nos. 3,534,896; 4,864,702; 4,864,713; and 4,908,928, as well as European Patent Publication No. 0 384 057, the subject matter of which are incorporated herein by reference thereto. Low reaction force, upsetting riveting tooling will be preferred when riveting.

Z' movement of the radially outer tooling, indicated by the arrow "Z'" in FIG. 1, is achieved in part by movement of the entire outer head 30 with respect to the associated carriage 34. To this end, the outer half 124 of the outer head 30 is supported at four corners by a pair of diametrically opposed guide pins 142 and a pair of diametrically opposed screw drives 144, which screw drives are driven by a Z' motor 146 under the control of the CNC controller 58. The second half 124 of the inner head assembly 28 may be shifted in a Z' direction in the same manner as the outer head assembly 30. However, the inner head assembly may be rigidly supported on the associated carriage 32 in any desired manner. When this is the case, the tooling mounted upon the inner head half 122 of the inner head assembly 28 may be moved in a Z'-axis direction by a suitable mechanism such as a hydraulic cylinder assembly or the like, the flow of hydraulic fluid to the flow assembly cylinder also being under the control of the CNC controller 58.

Figure 5:
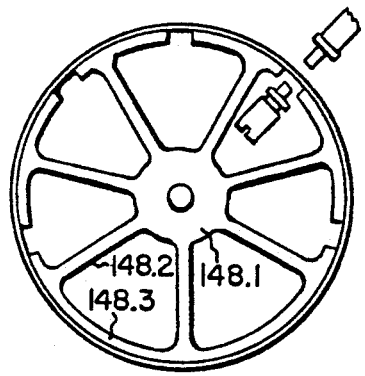
FIG. 5 shows a fixture which may be utilized for supporting the workpiece assembly.

The workpiece assembly 12 which is to be worked upon by the apparatus may be supported by any suitable fixtures which may be desired. One form of fixturing device is illustrated in FIG. 5, the device comprising a plurality of coaxial spiders 148 which include a hub portion 148.1, spokes 148.2, and outer segments 148.3. The workpiece assembly is supported upon the spiders 148 in any suitable manner, and as can be seen from FIG. 5, the radially inner tooling may pass through suitable gaps between spokes 148.2. While one form of fixturing device has been partially illustrated in FIG. 5, it should be appreciated that other forms of fixturing devices can be developed.

Figure 4:
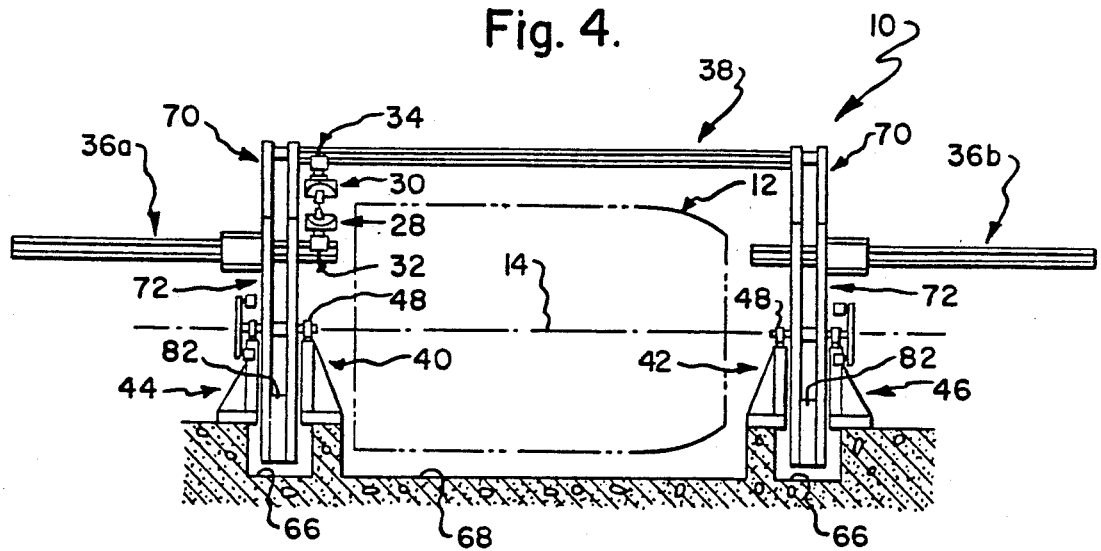
FIG. 4 is a view similar to FIG. 1 but showing the inner beam of the apparatus in its fully split position.

The workpiece assembly 12 which is to be fastened together is placed beneath the outer beam 38 and between the left-hand and right-hand trunnion assemblies 40, 42. As can be seen from FIG. 4, in order to load or unload the workpiece assembly at the workstation it will be necessary to have the inner beam spaced away from the area which is to be occupied by the workpiece assembly. This can be accomplished by splitting the inner beam assembly 36 in the manner best illustrated in FIGS. 2 and 4. Thus, as can be seen in FIG. 4, the beam may be split into two parts and moved axially away from each other so that the ends which are adjacent each other in the operative position are spaced away from each other a distance sufficient to permit the loading or unloading of the arc-shaped workpiece assembly. To this end, each of the inner beam halves 36a, 36b is supported by a linear track assembly 150, FIG. 3A, for sliding movement towards and away from each other, the assemblies 150 being of the same type as the assemblies 116. The linear track assemblies 150 and the beam 36 are mounted within a sleeve 152 supported by the radially movable portion 70 of one of the support arms 40, 42. Mounted upon the sleeve 152 is a motor and pinion (not shown) which may engage the rack 118.

After the workpiece assembly 12 has been loaded within the apparatus of this invention 10, the beam halves 36a and 36b are caused to be moved towards each other until pilot pins 154 engage suitable apertures. The parts are then secured together by a driven screw 156 which engages a suitable nut-like element at the end of the other inner beam half, these parts being illustrated in FIG. 2.

The manner in which a workpiece may be assembled should be obvious from the foregoing; however, it should be noted that the inner beam is suitably positioned with respect to the workpiece assembly by swinging the arms 40, 42 to their desired position in an a-axis direction. The inner and outer carriages are then moved to a suitable location in a x-axis direction and the radially inwardly and outwardly movable support arm portion 70 of each of the support arms 40 and 42 are simultaneously moved together in a z-axis direction to properly position the inner beam with respect to the workpiece. The tooling is then moved into its engagement position in a z-axis direction and this is accomplished by moving the lower tooling upwardly with respect to the inner half 122 of the inner head 28 and by extending the outer head 30 downwardly by actuation of the screw drives 144. Sensors 136 and 138 will detect when the workpiece is not normal and will cause corresponding b-axis rotation of the inner head halves 122 of both the upper and lower heads 28 and 30 when there is a lack of normality. Once the parts have been properly oriented with respect to the workpiece, normal fastening operations can commence and one typical example is described in U.S. Pat. No. 4,864,713.

In summary, it can be observed that there are essentially four degrees of movement of the tooling. Thus, there is "X" movement as the carriages 32, 34 move along the beams 36, 38. There is "Z" movement as both beams are moved simultaneously by simultaneous movement of the support arm portions 70 under control of motors 92. In addition, there is independent Z' movement of the upper and lower tooling, the Z' movement of the lower tooling being under the control of a hydraulic cylinder or the like, and the Z' prime movement of the upper tooling being under the control of the Z' motor 146. Rotational movement is provided about the centerline 14 by simultaneous swinging movement of arm assemblies 40, 42, which swinging movement is controlled by motors 56, this swinging movement being referred to as a-axis swinging movement. Finally, there is also b-axis movement as the shiftable head halves 122 may be rotated with respect to the arcuate tracks 136 under the control of b-axis drive motors 132. All of these various movements are controlled by a CNC controller 58.

While a preferred form of the present invention has been illustrated and shown in the accompanying drawings and described in detail above, it is to be understood that applicant does not intend to be limited to the particular details shown and described above, but that, in fact, intends to claim as his invention the subject matter set forth in the following claims.

What is claimed is:

1. Method for positioning tooling with respect to an arc-shaped workpiece assembly spaced radially away from a centerline, the method comprising the following steps:

providing first and second beams generally parallel to the centerline, each of the beams carrying tooling movable along the beam;

positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane, said positioning the beams including moving the beams along an arcuate path about an axis substantially parallel to said centerline;

moving the tooling along the beams parallel to the centerline so that the tooling is disposed on opposite sides of the desired location on the workpiece assembly; and moving the tooling into engagement with the workpiece assembly at the desired location.

2. Method for positioning tooling with respect to an arc-shaped workpiece assembly spaced radially away from a centerline, the method comprising the following steps:

providing first and second beams generally parallel to the centerline, each of the beams carrying tooling movable along the beam;

positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane, the first and second beams being supported on spaced apart supports, the beams being positioned by swinging the supports about the centerline;

moving the tooling along the beams parallel to the centerline so that the tooling is disposed on opposite sides of the desired location on the workpiece assembly; and moving the tooling into engagement with the workpiece assembly at the desired location.

3. The method for positioning tooling as set forth in claim 2 wherein only two spaced apart supports are provided, each support supporting an end of both of the first and second beams, and wherein the beams are positioned by simultaneously swinging the two supports about the centerline.

4. The method for positioning tooling as set forth in claim 1 wherein first and second carriages are mounted on the first and second beams, respectively and wherein the tooling is carried by the carriages, the tooling being moved along the beams by moving the carriages.

5. The method for positioning tooling as set forth in claim 4 wherein the carriages are moved simultaneously so that at all times they lie in a plane normal to the centerline.

6. The method for positioning tooling as set forth in claim 4 wherein the tooling is mounted on the carriages for movement relative to the carriages, the tooling being moved away from the associated carriage as it is moved into engagement with the workpiece assembly.

7. Method for positioning tooling with respect to an arc-shaped workpiece assembly spaced radially away from a centerline; the method comprising the following steps:

providing first and second beams generally parallel to the centerline, each of the beams carrying tooling movable along the beam;

positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane;

moving the first and second beams towards and away from the centerline;

moving the tooling along the beams parallel to the centerline so that the tooling is disposed on opposite sides of the desired location on the workpiece assembly; and moving the tooling into engagement with the workpiece assembly at the desired location.

8. The method for positioning tooling as set forth in claim 7 wherein the first and second beams are supported on spaced apart radially movable first and second supports, one of the first and second supports supporting one end of both of the first and second beams, and the other one of the first and second supports supporting the other end of both of the first and second beams, and wherein the beams are moved towards and away from the centerline by simultaneous radial movement of the first and second supports.

9. Method for positioning tooling with respect to an arc-shaped workpiece assembly spaced radially away from a centerline, the method comprising the following steps:

providing first and second beams generally parallel to the centerline, each of the beams carrying tooling movable along the beam;

positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane, said positioning the beams including moving the beams along an arcuate path about an axis substantially parallel to said centerline, moving the tooling along the beams parallel to the centerline so that the tooling is disposed on opposite sides of the desired location on the workpiece assembly;

moving the tooling along the beams parallel to the centerline so that the tooling is disposed on opposite sides of the desired location on the workpiece assembly; and moving the tooling radially towards the workpiece assembly and shifting the tooling about a center point on the workpiece assembly so that the tooling when engaging the workpiece assembly at the desired location is both normal to and coaxial with the center point.

10. Method for positioning tooling with respect to an arc-shaped workpiece assembly spaced radially away from a centerline, the method comprising the following steps:

providing first and second beams generally parallel to the centerline, each of the beams carrying tooling movable along the beam;

positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane;

moving the tooling along the beams parallel to the centerline so that the tooling is disposed on opposite sides of the desired location on the workpiece assembly;

moving the tooling radially towards the workpiece assembly and shifting the tooling about a center point on the workpiece assembly so that the tooling when engaging the workpiece assembly at the desired location is both normal to and coaxial with the center point; and the first and second carriages being mounted on the first and second beams, respectively, tooling supporting heads being mounted on the carriages, at least one of the heads being movable radially with respect to the associated carriage, and each of the heads having a relatively stationary half and a shiftable half, the tooling being moved radially by moving one of the heads with respect to the associated carriage and the tooling being shifted by shifting the shiftable half of the tool supporting heads.

11. Method for positioning tooling with respect to an arc-shaped workpiece assembly spaced radially away from a centerline; the method comprising the following steps:

providing first and second beams generally parallel to the centerline, each of the beams carrying tooling movable along the beam;

positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane;

moving the first and second beams towards and away from the centerline;

moving the tooling along the beams parallel to the centerline so that the tooling is disposed on opposite sides of the desired location on the workpiece assembly; and moving the tooling radially towards the workpiece assembly and shifting the tooling about the desired location on the workpiece assembly so that the tooling when moved into engagement with the workpiece assembly at the desired location is both normal to and coaxial with the desired location.

12. Apparatus for positioning tooling with respect to an arc-shaped workpiece assembly spaced radially away from a centerline, the apparatus comprising the following:

first and second beams generally parallel to the centerline; tooling movable along each of the beams;

beam positioning means for positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane, said beam positioning means causing said beams to move along an arcuate path about an axis substantially parallel to said centerline;

means for moving the tooling along the beams parallel to the centerline so that the tooling is disposed on opposite sides of the desired location on the workpiece assembly; and means for moving the tooling into engagement with the workpiece assembly at the desired location.

13. Apparatus for positioning tooling with respect to an arc-shaped workpiece assembly spaced radially away from a centerline, the apparatus comprising the following:

first and second beams generally parallel to the centerline; tooling movable along each of the beams;

beam positioning means for positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane, the first and second beams being supported on spaced apart supports, the beam positioning means causing the supports to be swung about the centerline, means for moving the tooling along the beams parallel to the centerline so that the tooling is disposed on opposite sides of the desired location on the workpiece assembly; and means for moving the tooling into engagement with the workpiece assembly at the desired location.

14. The apparatus for positioning tooling as set forth in claim 13 wherein only two spaced apart supports are provided, each support supporting one end of each of the first and second beams, and wherein the beam positioning means simultaneously swings the two supports about the centerline.

15. The apparatus for positioning tooling as set forth in claim 12 wherein first and second carriages are mounted on the first and second beams, respectively and wherein the tooling is carried by the carriages, the means for moving the tooling along the beams including a rack on each of the beams, and a driven pinion on each of the carriages, the driven pinion being under the control of a CNC controller.

16. The apparatus for positioning tooling as set forth in claim 15 wherein the CNC controller moves the carriages simultaneously so that at all times the first and second carriages lie in a single plane normal to the centerline.

17. The apparatus for positioning tooling as set forth in claim 15 wherein in the tooling is mounted on the carriages for movement relative to the carriages, the means for moving the tooling into engagement with the workpiece assembly also causing the tooling to move away from the associated carriage.

18. Apparatus for positioning tooling with respect to an arc-shaped workpiece assembly spaced radially away from a centerline; the apparatus comprising the following:

first and second beams generally parallel to the centerline;

tooling movable along each of the beams;

beam positioning means for positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane;

means for moving the first and second beams towards and away from the centerline;

means for moving the tooling along the beams parallel to the centerline so that the tooling is disposed on opposite sides of the desired location on the workpiece assembly; and means for moving the tooling into engagement with the workpiece assembly at the desired location.

19. The apparatus for positioning tooling as set forth in claim 18 wherein the first and second beams are supported on spaced apart radially movable first and second supports, one of the first and second supports supporting one end of both of the first and second beams, and the other one of the first and second supports supporting the other end of both the first and second beams, and wherein the means for moving the first and second beams towards and away from the centerline causes simultaneous radial movement of both of the first and second supports.

20. Apparatus for positioning tooling with respect to an arc-shaped workpiece assembly spaced radially away from a centerline, the apparatus comprising the following:

first and second beams generally parallel to the centerline; tooling movable along each of the beams;

beam positioning means for positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane, said beam positioning means causing said beams to move along an arcuate path about an axis substantially parallel to said centerline;

means for moving the tooling along the beams parallel to the centerline so that the tooling is disposed on opposite sides of the desired location on the workpiece assembly; and means for moving the tooling radially towards the workpiece assembly and for shifting the tooling about the center point on the workpiece assembly so that the tooling when moved into engagement with the workpiece assembly at the desired location is both normal to and coaxial with the center point.

21. Apparatus for positioning tooling with respect to an arc-shaped workpiece assembly spaced radially away from a centerline; the apparatus comprising the following:

first and second beams generally parallel to the centerline; tooling movable along each of the beams;

beam positioning means for positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane;

means for moving the tooling along the beams parallel to the centerline so that the tooling is disposed on opposite sides of the desired location on the workpiece assembly;

means for moving the tooling radially towards the workpiece assembly and for shifting the tooling about the center point on the workpiece assembly so that the tooling when moved into engagement with the workpiece assembly at the desired location is both normal to and coaxial with the center point; and first and second carriages being mounted on the first and second beams, respectively, tooling supporting heads being mounted on the carriages, at least one of the heads being movable radially with respect to the associated carriage, and each of the heads having a relatively stationary half and a shiftable half, the means for moving the tooling moving one of the heads with respect to the associated carriage and the means for shifting the tooling about the center point including shifting the shiftable half of the tool supporting heads.

22. Apparatus for positioning tooling with respect to an arc-shaped workpiece assembly spaced radially away from a centerline; the apparatus comprising the following:

first and second beams generally parallel to the centerline;

tooling movable along each of the beams;

beam positioning means for positioning the beams so that the beams are disposed on opposite sides of a desired location on the workpiece assembly, the desired location on the workpiece assembly lying at the intersection of a plane perpendicular to the centerline and an angular reference plane, the centerline lying within the angular reference plane;

means for moving the first and second beams towards and away from the centerline;

means for moving the tooling along the beams parallel to the centerline so that the tooling is disposed on opposite sides of the desired location on the workpiece assembly; and means for moving the tooling radially towards the workpiece assembly and for shifting the tooling about the center point on the workpiece assembly so that the tooling when moved into engagement with the workpiece assembly at the desired location is both normal to and coaxial with the center point.

23. Method for positioning an arc-shaped workpiece assembly within an apparatus having first and second beams which extend generally parallel to the centerline of the arc-shaped workpiece assembly, the first beam being adapted to be disposed on the outside of the arc-shaped workpiece assembly and the second beam being adapted to be disposed on the inside; said method comprising the following steps:

providing a second beam having first and second axially aligned sections which can be connected to each other and disconnected from each other;

disconnecting the first and second sections of the second beam from each other;

moving the first and second sections of the second beam away from each other;

positioning the workpiece assembly adjacent the first beam with a void in the workpiece assembly being in alignment with the first and second sections of the second beam;

moving the first and second sections of the second beam towards each other; and connecting the first and second sections together.

24. Apparatus for positioning tooling with respect to an arc-shaped workpiece assembly spaced radially away from the centerline of the apparatus, the apparatus comprising the following:

first and second axially spaced apart swingable support arm assemblies mounted for swinging movement about the centerline;

first and second beams generally parallel to the centerline, the first beam being supported on the first and second axially spaced apart support arm assemblies a distance further away from the centerline than the workpiece assembly and the second beam being supported on the arm assemblies a distance closer to the centerline than the workpiece assembly, the second beam having a first and second disconnectable sections;

means for moving the first and second disconnectable portions of the second beam towards and away from each other;

means for securing the first and second disconnectable portions of the second beam together; and tooling supported by the first and second beams.

25. The apparatus as set forth in claim 24 wherein each of the axially spaced apart swingable supports includes a radially inwardly and outwardly movable section, the first and second beams being supported upon the regular inwardly and outwardly movable section for simultaneous movement of both of the beams towards and away from said centerline.

26. The apparatus as set forth in claim 24 wherein each of the axially spaced apart swingable supports includes a sleeve portion, the disconnectable sections of the second beam being supported by said sleeve portion, and wherein the means for moving the disconnectable beams sections of the second beam towards and away from each other are associated with each of said sleeve portions.

* * * * *

UNITED STATES PATENT AND TRADEMARK OFFICE
CERTIFICATE OF CORRECTION

PATENT NO.  :  5,154,643

DATED       :  October 13, 1992

INVENTOR(S) :  Mark J. Catania and Ernest K. Krell

It is certified that error appears in the above-identified patent and that said Letters Patent is hereby corrected as shown below:

Claim 25, line 5 "regular" should be --radially--.

Signed and Sealed this

Twenty-seventh Day of April, 1993

Attest:

MICHAEL K. KIRK

*Attesting Officer*   Acting Commissioner of Patents and Trademarks